(12) United States Patent
Smith (10) Patent No.: US 7,952,833 B2
(45) Date of Patent: May 31, 2011

(54) HIGH DENSITY ELECTRICAL INTERCONNECT ASSEMBLY

(75) Inventor: Ralph Kevin Smith, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 911 days.

(21) Appl. No.: 11/906,227

(22) Filed: Oct. 1, 2007

(65) Prior Publication Data

US 2009/0086374 A1 Apr. 2, 2009

(51) Int. Cl.
*G11B 5/48* (2006.01)
(52) U.S. Cl. ................................ 360/234.5
(58) Field of Classification Search .......... 360/234.5, 360/234.6, 245.3, 245.8
See application file for complete search history.

(56) References Cited

U.S. PATENT DOCUMENTS

| | | | |
|---|---|---|---|
| 4,761,699 A * | 8/1988 | Ainslie et al. | 360/234.5 |
| 5,103,359 A * | 4/1992 | Marazzo | |
| 5,491,597 A | 2/1996 | Bennin et al. | |
| 5,896,248 A * | 4/1999 | Hanrahan et al. | |
| 6,188,546 B1 | 2/2001 | Nakajima et al. | |
| 6,233,117 B1 * | 5/2001 | Rancour et al. | |
| 6,276,958 B1 * | 8/2001 | Chih | |
| 6,280,240 B1 * | 8/2001 | Chang | |
| 6,349,017 B1 * | 2/2002 | Schott | 360/234.6 |
| 6,757,135 B2 * | 6/2004 | Rancour et al. | |
| 6,813,118 B2 * | 11/2004 | Pust et al. | |
| 7,006,330 B1 * | 2/2006 | Subrahmanyam et al. | 360/234.5 |
| 2002/0057531 A1 * | 5/2002 | Segar et al. | |
| 2006/0044689 A1 * | 3/2006 | Lille | |
| 2006/0087768 A1 * | 4/2006 | Erpelding et al. | |
| 2006/0164760 A1 * | 7/2006 | Nikitin et al. | |

OTHER PUBLICATIONS

U.S. Appl. No. 11/439,047, Zhu, et al.*

* cited by examiner

*Primary Examiner* — Angel A. Castro
(74) *Attorney, Agent, or Firm* — Jennifer M. Buenzow (57) ABSTRACT

An electrical connection assembly includes a body, an electrically insulative layer supported by the body, a first bond pad defined on the electrically insulative layer, a first electrical contact pad defined on the electrically insulative layer and electrically isolated from the first bond pad, a circuit located adjacent to the electrically insulative layer defining a second bond pad and a second electrical contact pad that are electrically isolated from each other, and an electrically conductive bonding material that electrically and mechanically links the first and second bond pads. After setting, the electrically conductive bonding material biases the first and second electrical contact pads against each other in order to create an electrical connection therebetween.

20 Claims, 8 Drawing Sheets

Fig. 6

HIGH DENSITY ELECTRICAL INTERCONNECT ASSEMBLY

BACKGROUND

The present invention relates to electrical connection assemblies.

Hard disc drives (HDDs) typically comprise one or more data storage discs, each disc having concentric data tracks for storing data. Where multiple discs are used, a stack is formed of co-axial discs having generally the same diameter. A transducing head carried by a slider is used to read from and write to data tracks on an associated disc. The slider is carried by a head arm assembly (HAA) that includes an actuator arm and a suspension, and can include a separate gimbal structure or can integrally form a gimbal with the suspension. As the disc is spun, the slider glides above the surface of the disc on a small cushion of air. The actuator arm movably positions the slider with respect to the disc. Electrical connections extend along the suspension to electrically connect the transducing head to components located at or near the actuator arm. Those electrical connections can be formed on the suspension itself, or can be located on a separate electrical interconnect structure supported relative to the suspension, such as a flex-on suspension (FOS).

A typical slider includes a slider body (often called the "substrate") and an electrically insulative overcoat that supports a transducing head. In some configurations, a plurality of bond pads, usually a minimum of four, are formed at a side or edge of the slider—typically at its trailing edge. In alternative configurations, "top" bond pads are located on a back side of the slider (synonymously called the "top" of the slider). In either type of configuration, the bond pads are electrically connected through the overcoat to various components, such as to the transducing head or to a heater.

During fabrication of a HDD, the slider is mechanically secured to a load button or load point of the gimbal at the top (or back side) of the slider, for example, with an adhesive. Next, the bond pads are electrically connected to the electrical connections (i.e., traces) along the suspension. Conventional gold ball bonding, solder reflow, friction welding and solder jetting operations are used to make the electrical connections from the bond pads of the slider to connection points for the traces along the suspension.

In some situations, it is desirable to provide large numbers of electrical connections to a slider. The sizes of sliders and transducing heads continue to decrease, and trends are for sliders to continue to be smaller. Also, the sizes of bond pads generally decrease with smaller slider sizes. However, relatively small slider and bond pad sizes present numerous difficulties for providing relatively large numbers of electrical connections (e.g., bond pads) to a slider in a relatively small space. Relatively small, closely-spaced bond pads tend to present undesirably high manufacturing yield losses. For example, conventional soldering methods and equipment can present risk of bridging adjacent bond pads, which essentially results in undesired shorting between those bond pads as solder material adheres to multiple bond pads. Solder reflow methods require heating of the entire article on which bond pads are located, which presents a risk of damaging sensitive structures, such as transducers carried within a slider that is heated. Friction welding methods can require an undesirably large space for clamping parts to be welded, and can place design-restrictive rigidity requirements on those parts. Furthermore, slider designs using top bond pads can be undesirably costly, for instance, in terms of time and equipment required for fabrication.

SUMMARY

An electrical connection assembly includes a body, an electrically insulative layer supported by the body, a first bond pad defined on the electrically insulative layer, a first electrical contact pad defined on the electrically insulative layer and electrically isolated from the first bond pad, a circuit located adjacent to the electrically insulative layer defining a second bond pad and a second electrical contact pad that are electrically isolated from each other, and an electrically conductive bonding material that electrically and mechanically links the first and second bond pads. After setting, the electrically conductive bonding material biases the first and second electrical contact pads against each other in order to create an electrical connection therebetween.

DETAILED DESCRIPTION

In general, the present invention provides a relatively high density electrical interconnection assembly. According to one embodiment of the present invention, an electrically conductive bonding material (e.g., certain types of solder or conductive adhesive) that shrinks upon setting forms one or more electrical connections between bond pads on a first component and a second component. Shrinking of the electrically conductive bonding material draws those two components together and brings at least one pair of "dry" electrical contacts into physical contact with each other, thereby creating at least one other electrical connection. There is no need to apply an electrically conductive bonding material to the dry electrical contacts, because biasing provided by the electrically conductive bonding material that electromechanically links the bond pads also holds the dry electrical contacts together. In this way, a relatively large number of discrete electrical connection points can be made within a relatively small space, while helping to reduce manufacturing yield losses typically associated with the application of electrically conductive bonding material to small, closely spaced bond pads. Also, costs and certain design constraints can be reduced. The present invention has applicability for making electrical connections in disc drive systems, but can have other applications as well.

Figure 1:
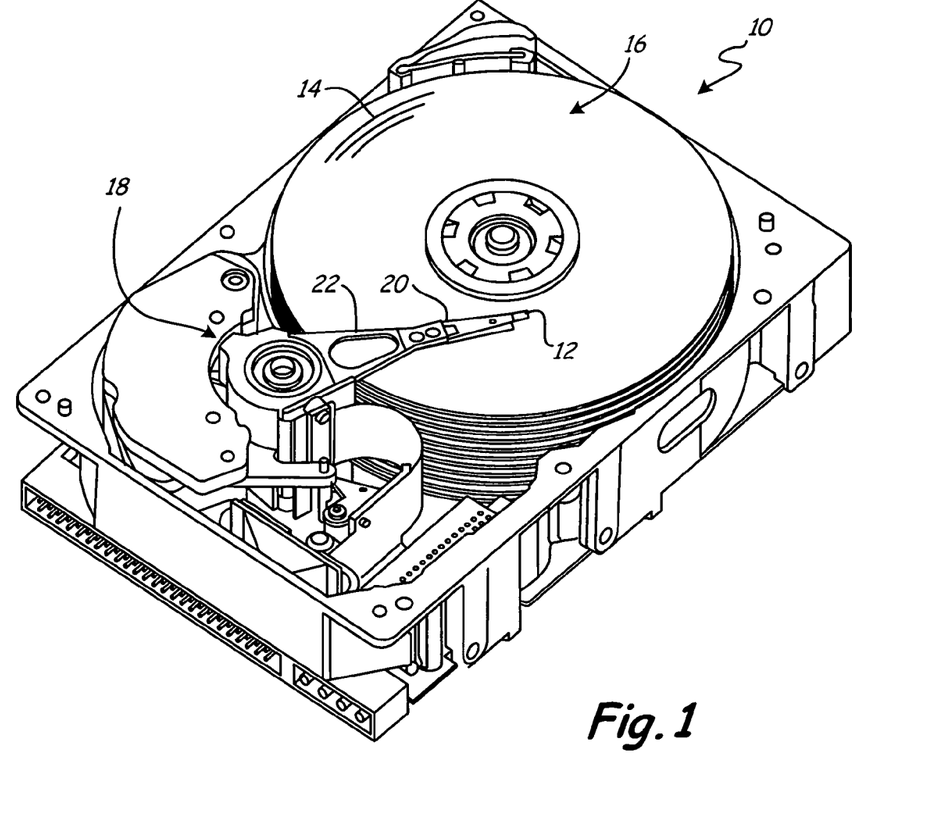
FIG. 1 is a perspective view of an exemplary hard disc drive system.

FIG. 1 is a perspective view of an exemplary disc drive system 10 for positioning a slider 12 over a selected data track 14 of a magnetic storage medium 16, such as a disc. The illustrated disc drive system 10 includes a voice coil motor (VCM) 18 arranged to rotate a head gimbal assembly (HGA) that includes a suspension 20 supported by an actuator arm 22. The slider 12 carries at least one transducing element (not visible in FIG. 1) for reading and/or writing data on the selected track 14 of the storage medium 16. An interconnect circuit located along the suspension 20 electrically connects the slider 12 and components located on or near the actuator arm 22.

Figure 2A:
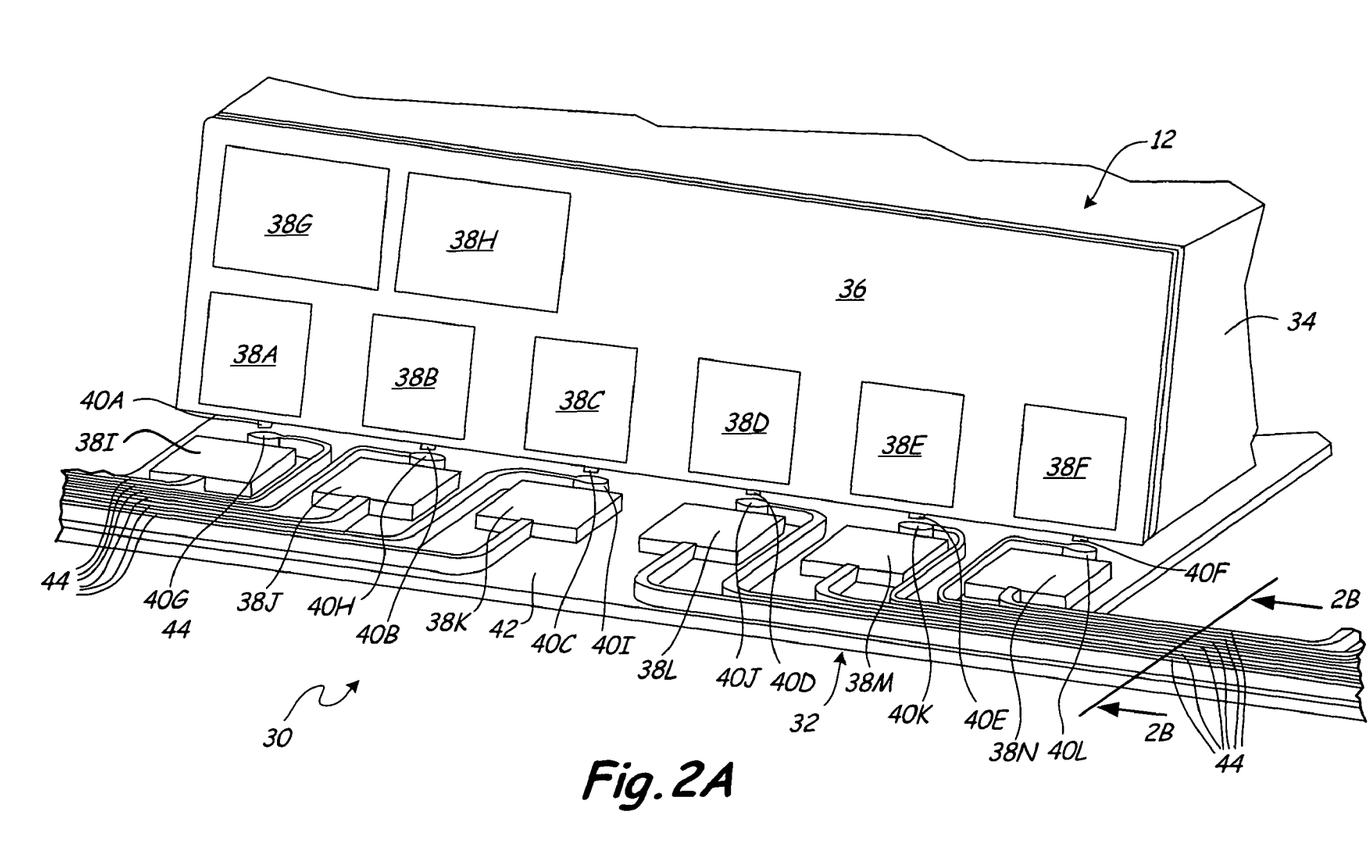
FIG. 2A is a perspective view of a portion of an electrical interconnection assembly according to one embodiment of the present invention during assembly.
Figure 2B:
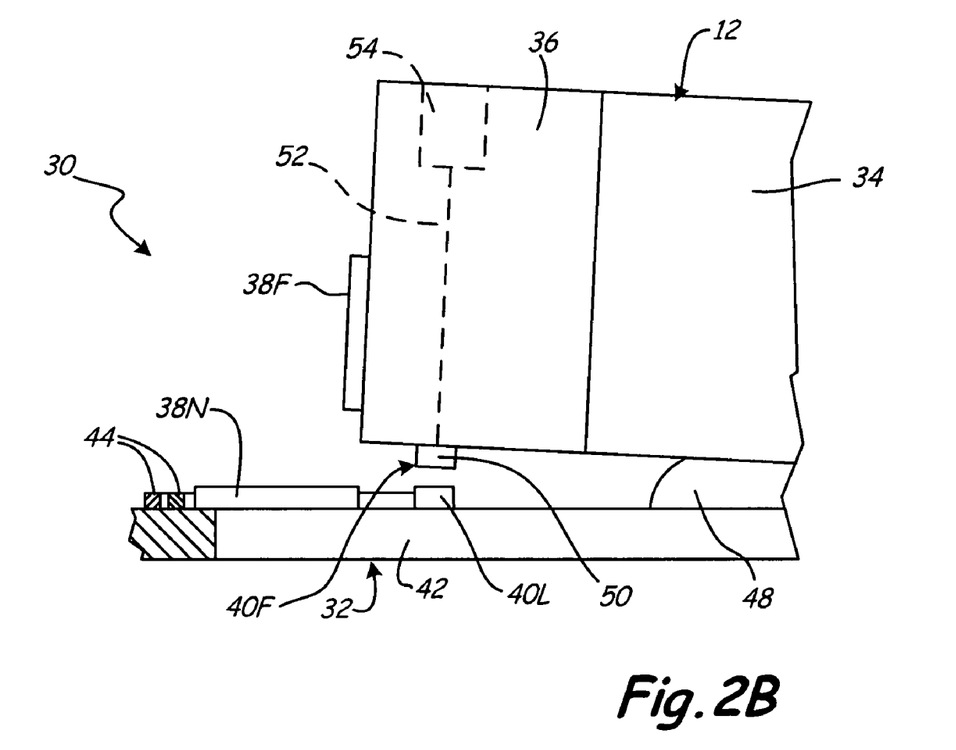
FIG. 2B is a cross-sectional view of a portion of the electrical interconnection assembly during assembly, taken along line 2B-2B of FIG. 2A.

An electrical interconnection is made between the slider 12 and the interconnect circuit located along the suspension 20. FIG. 2A is a perspective view of a portion of an electrical interconnection assembly 30 during assembly. FIG. 2B is a cross-sectional view of a portion of the electrical interconnection assembly 30 during assembly, taken along line 2B-2B of FIG. 2A. As shown in FIGS. 2A and 2B, the slider 12 is positioned adjacent to an interconnect circuit 32. The slider 12 includes a slider body (or substrate) 34 and an overcoat portion 36. The slider body 34 is typically electrically conductive, while the overcoat portion 36 is typically electrically insulative. In the illustrated embodiment, a plurality of discrete bond pads 38A-38H are located on the overcoat portion 36. These bond pads 38A-38H are electrically isolated from each other, in the sense that they provide discrete electrical connection points separated from each other by electrically insulative material (e.g., alumina) of the overcoat potion 36. In addition, a plurality of discrete electrical contact pads 40A-40F are located on the overcoat portion 36. The electrical contact pads 40A-40F are electrically isolated from each other. Moreover, the bond pads 38A-38H and the electrical contact pads 40A-40F are separated from each other and are electrically isolated from each other. In the illustrated embodiment, the bond pads 38A-38H are all located on a trailing edge face of the slider 12, and the electrical contact pads 40A-40F are all located on a top (or back side) face of the slider 12, oriented at approximately 90° with respect to the bond pads 38A-38H. The top face of the slider 12 is defined generally opposite an air bearing surface of the slider 12. It should be recognized that the particular shapes of the bond pads 38A-38H and the electrical contact pads 40A-40F can vary as desired for particular applications. For instance, rectangular, round, oval, and other shapes are possible. Moreover, the particular locations and orientations of the bond pads 38A-38H and the electrical contact pads 40A-40F can vary as desired for particular applications, for instance, they can all be located along the same face of the slider 12.

A transducing element (not visible in FIG. 2A), such as a magnetoresistive (MR) read head or writer, is supported within the overcoat portion 36. One or more of the bond pads 38A-38H and/or contact pads 40A-40F can be electrically connected to the transducing element or other elements (e.g., a heater) through the overcoat portion 36. It should be recognized that the particular configuration of the electrical connection can vary as desired for particular applications.

The interconnect circuit 32 includes an electrically insulative substrate 42, bond pads 38I-38N, electrical contact pads 40G-40L, and a number of electrical traces 44. The electrical traces 44 extend along the interconnect circuit 32 in a desired configuration to electrically link any of the bond pads 38I-38N and the electrical contact pads 40G-40L to other components (e.g., components located behind the actuator arm 22 as shown in FIG. 1). In the illustrated embodiment, electric contact pads 40G-40L are generally aligned with bond pads 38I-38N, respectively. The electrical traces 44 are arranged in such a manner as to provide suitable spacing from adjacent electrically conductive components to reduce a risk of shorting (e.g., due to bridging), cross-talk, and/or other concerns.

The electrical contact pads 40A-40L can be smaller than the bond pads 38A-38N, because, as explained further below, there is no need to apply an electrically conductive bonding material to the electrical contact pads 40A-40L. Rather, the electrical contact pads 40A-40F of the slider 12 can be brought into physical contact with the electrical contact pads 40G-40L of the interconnect circuit 32, and suitably biased in such a configuration, to form a number of electrically isolated "dry" electrical connections. These electrical connections are referred to as "dry" because electrical connections can be made without an electrically conductive bonding material. However, such electrically conductive bonding material could still be used in alternative embodiments.

When the slider 12 is positioned adjacent to the interconnect circuit 32, and the electrical contact pads 40A-40F of the slider 12 are suitably aligned with the electrical contact pads 40G-40L of the interconnect circuit 32, electromechanical connections between one or more of the bond pads 38A-38F of the slider and one or more of the bond pads 38I-38N of the interconnect circuit 32 can be made using an electrically conductive bonding material.

Figure 2C:
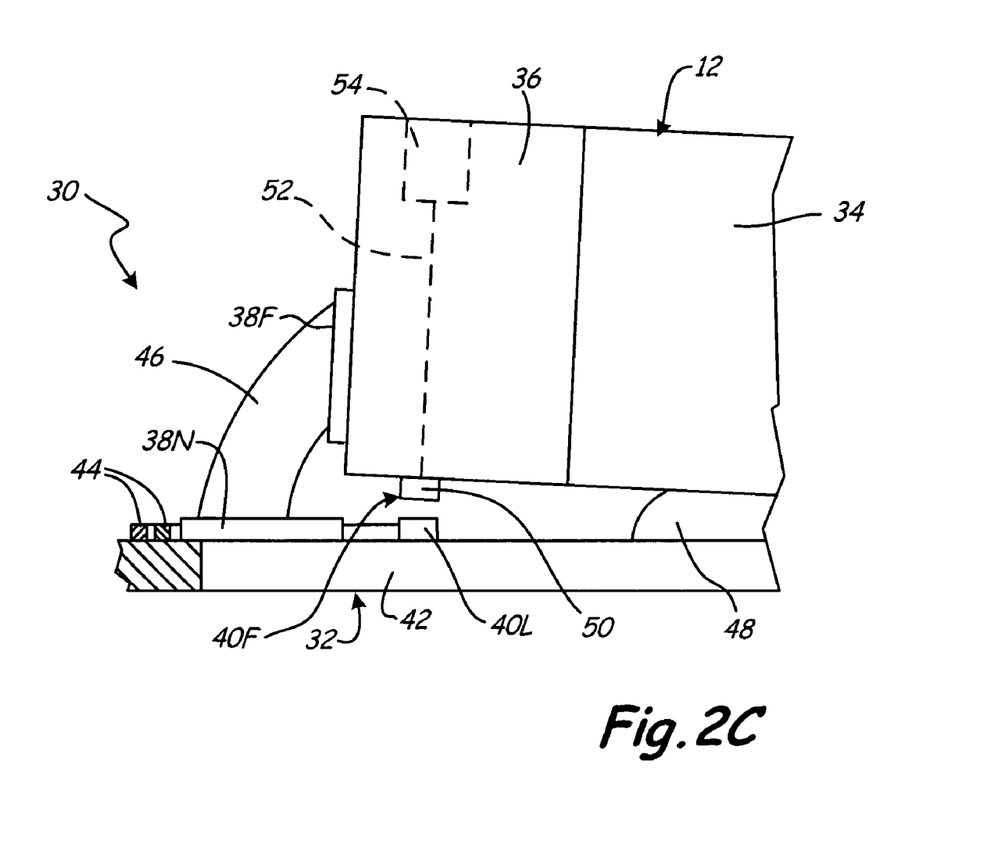
FIG. 2C is a cross-sectional view of the electrical interconnection assembly of FIG. 2B during assembly, after application of an electrically conductive bonding material but prior to setting.

FIG. 2C is a cross-sectional view of the electrical interconnection assembly 30 at a subsequent stage of assembly to that shown in FIG. 2B. As shown in FIG. 2C, an electrically conductive bonding material 46 and an adhesive 48 have been applied. The adhesive 48 is applied between the body 34 of the slider 12 and the substrate 42 of the interconnect circuit 32. The adhesive 48 is generally applied prior to application of the electrically conductive bonding material 46, and helps to hold the slider 12 and the interconnect circuit 32 in alignment during application of the conductive bonding material 46. The adhesive 48 can be applied at a location spaced from the bond pads 38A-38N and the electrical contact pads 40A-40L. The adhesive 48 can be applied with the slider 12 tipped toward the interconnect circuit at a leading edge of the slider 12, such that the electrically conductive bonding material 46 moves or tips the trailing edge closer to the interconnect circuit 32, upon setting. In further embodiments, raised features may be provided to ensure proper spacing between the slider 12 and the interconnect circuit 32 upon application of the adhesive 48. These raised features can be "dummy" electrical traces having a selected height, or other structures (e.g., structures disclosed in commonly-assigned U.S. Pat. No. 7,002,780, entitled "Suspension Design for Elevated Slider Attachment").

The electrically conductive bonding material 46 is applied between pairs of the bond pads 38A and 38I, 38B and 38J, 38E and 38M, and 38F and 38N on the slider 12 and the interconnect circuit 32, respectively, to form four discrete electromechanical connections. The bonding material 46 is electrically conductive, thereby allowing an electrical connection to be formed between selected bond pads. The electrically conductive bonding material 46 comprises a material that shrinks or contracts upon setting, enabling the bonding material 46 to move or tilt at least portions of the slider 12 and the interconnect circuit 32 closer together. However, it should be noted that FIG. 2C shows the electrically conductive bonding material 46 prior to setting, and therefore pairs of the electrical contact pads 40A and 40G, 40B and 40H, 40C and 40I, 40D and 40J, 40E and 40K and 40F and 40L remain spaced apart without forming electrical connections therebetween. As used herein, the term "setting" or "set" encompasses solidification and curing of bonding materials. For example, the electrically conductive bonding material 46 can be a solder (e.g., "SAC 305" solder, which is approximately 3% silver (Ag), 0.5% copper (Cu) and the remainder tin (Sn)) that shrinks upon solidification. Another example would be a conductive adhesive (e.g., an ultra-violet (UV) curable adhesive) that shrinks or contracts upon curing.

Figure 3:
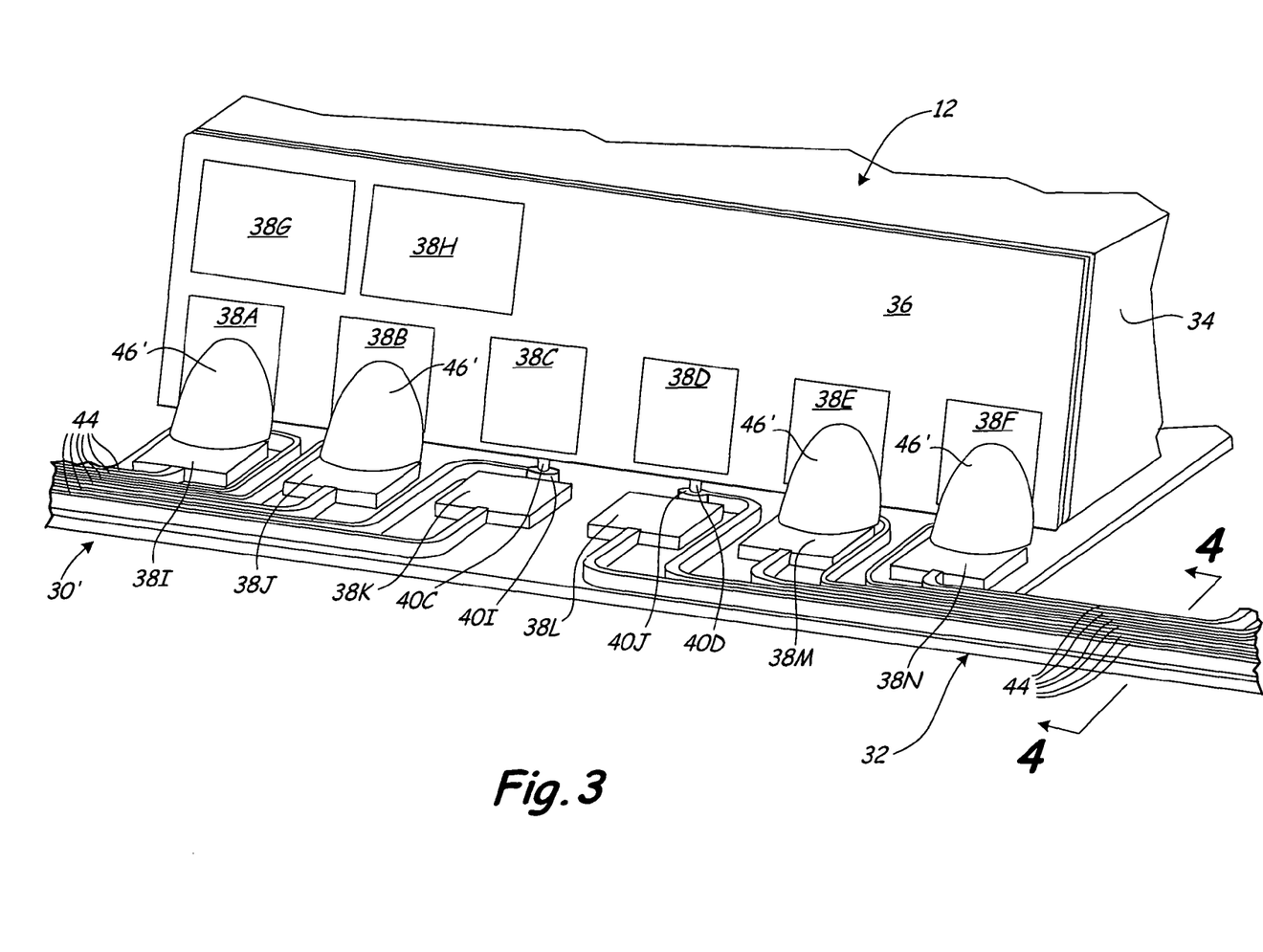
FIG. 3 is a perspective view of a portion of a fully assembled electrical interconnection assembly.
Figure 4:
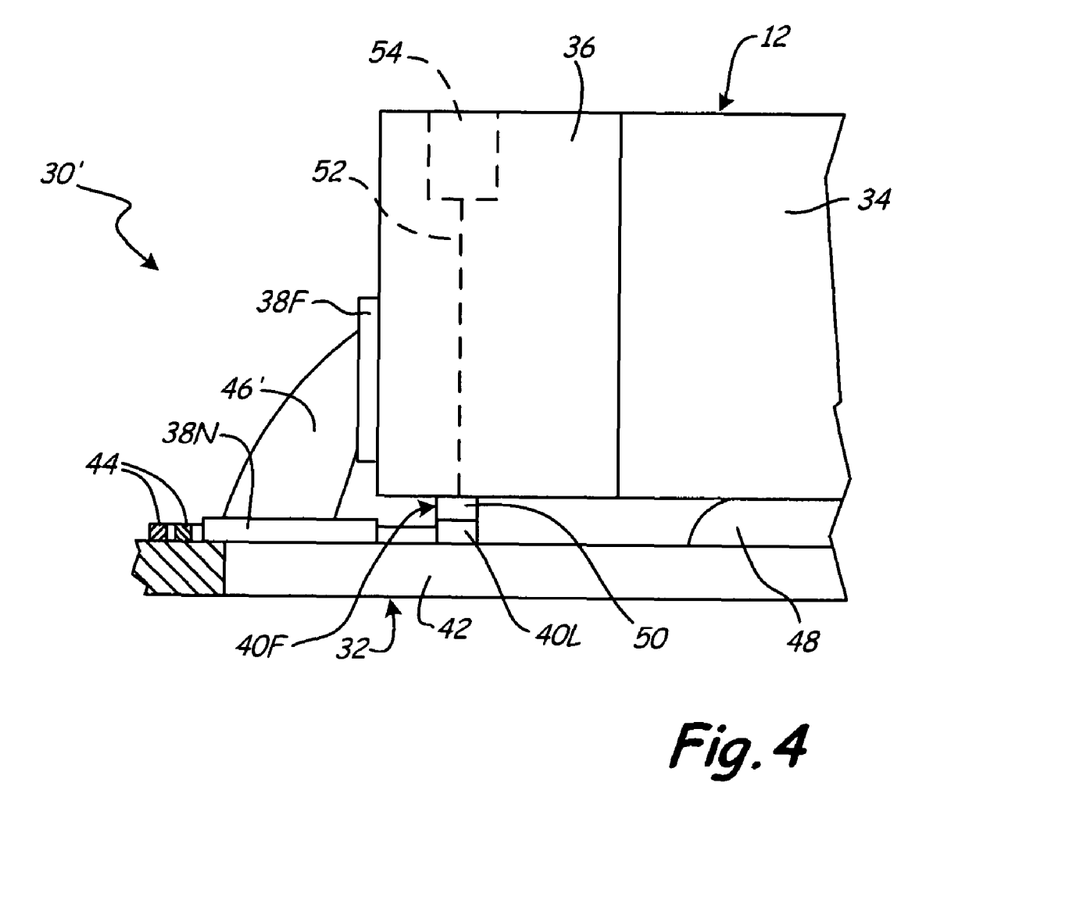
FIG. 4 is a cross-sectional view of the fully assembled electrical interconnection assembly taken along line 4-4 of FIG. 3.

FIG. 3 is a perspective view of a portion of a fully assembled electrical interconnection assembly 30', and FIG. 4 is a cross-sectional view of the fully assembled electrical interconnection assembly 30' taken along line 4-4 of FIG. 3. Once set, the electrically conductive bonding material is designated by the reference number 46' in FIGS. 3 and 4.

As shown in FIGS. 3 and 4, the set electrically conductive bonding material 46' has drawn the electrical contact pads 40A-40F on the slider 12 into physical contact with the electrical contact pads 40G-40L on the interconnect circuit 32 to form electrical connections therebetween. The set electrically conductive bonding material 46' provides mechanical (that is, structural) support between the slider 12 and the interconnect circuit 32, and also biases the electrical contact pads 40A-40F and 40G-40L against each other to maintain electrical contact therebetween. The amount of biasing force provided can vary as desired for particular applications. Some design considerations for the set electrically conductive bonding material 46' include the ability to suitably maintain electrical contact between the electrical contact pads 40A-40F and 40G-40L during operation and not break during shock events, or due to other damage. Also, the set electrically conductive bonding material 46' should be suitably thermally stable to help maintain electrical contact between the electrical contact pads 40A-40F and 40G-40L across an expected range of thermal operating conditions. Moreover, the set electrically conductive bonding material 46' should be suitably rigid to help limit creep, in order to suitably maintain electrical contact between the electrical contact pads 40A-40F and 40G-40L over time.

In the embodiment shown in FIGS. 2A-4, the electrical contact pads 40A-40F are configured to stand proud from the top face (or back side) of the overcoat portion 36 of the slider 12. In the illustrated embodiment, as shown in FIGS. 2B, 2C and 4, the electrical contact pad 40F includes an exposed, raised portion 50 and a conductive stud 52 that extends into the overcoat portion 36 of the slider 12. The conductive stud 52 is electrically connected to a transducer element 54 (e.g., an MR read element or writer), which is shown schematically in FIGS. 2B, 2C and 4. Similar structures (not shown) can be provided for one or more of the other electrical contact pads 40A-40E. The conductive stud 52 can be formed in a well-known manner, and the raised portion 50 can be applied (e.g., using plating or other processes) over the conductive stud 52 in a way that maintains an electrical connection to the stud 52. The proud configuration of the raised portion 50 of the electrical contact pad 40F facilitates making contact with the electrical contact pad 40L to form an electrical connection.

It should be noted that electrically conductive bonding material 46 can be applied between any number of associated pairs of the bonding pads 38A and 38I, 38B and 38J, 38E and 38M, and 38F and 38N on the slider 12 and the interconnect circuit 32. In some instances, the biasing force provided by the set electrically conductive bonding material 46' may be sufficient to deform the slider 12, which can cause problems for the transducing element 54, such as pole-tip recession. In order to help lessen such problems associated with the transducing element 54, some areas can be left free of the set bonding material 46'. As shown in FIG. 3, no electrically conductive bonding material 46 is applied between the pairs of bonding pads 38C and 38K, and 38D and 38L, which are located near the transducing element 54 (within the overcoat portion 36 of the slider 12). In that way, the set electrically conductive bonding material 46' is laterally spaced from the transducing element 54. The lack of set electrically conductive bonding material 46' at those selected locations helps reduce a risk of undesired pole-tip recession.

Figure 5:
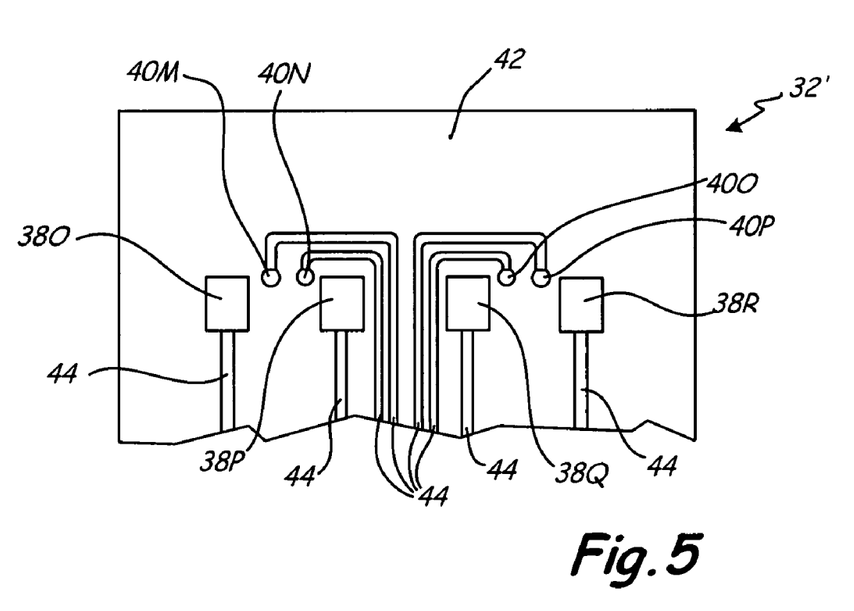
FIG. 5 is a top view of a portion of an alternative embodiment of an interconnect circuit for use with the electrical interconnection assembly of the present invention.

FIG. 5 is a top view of a portion of an alternative embodiment of an interconnect circuit 32' that includes bond pads 38O-38R, electrical contact pads 40M-40P and electrical traces 44. In the embodiment of FIG. 5, there are no bond pads located in a central region of the interconnect circuit 32, and instead, traces 44 extending to the electrical contact pads 40M-40P are routed through that central region. In such a configuration, bond pads are essentially eliminated from the central region to help reduce a risk of undesired pole-tip recession, while the region without bond pads is utilized for traces 44 to conserve space. In this way, pole tip recession can be reduced by not applying an electrically conductive bonding material to some bonding pads (as discussed above), by arranging bond pads in a desired manner, or by omitting bond pads from selected regions.

Figure 6:
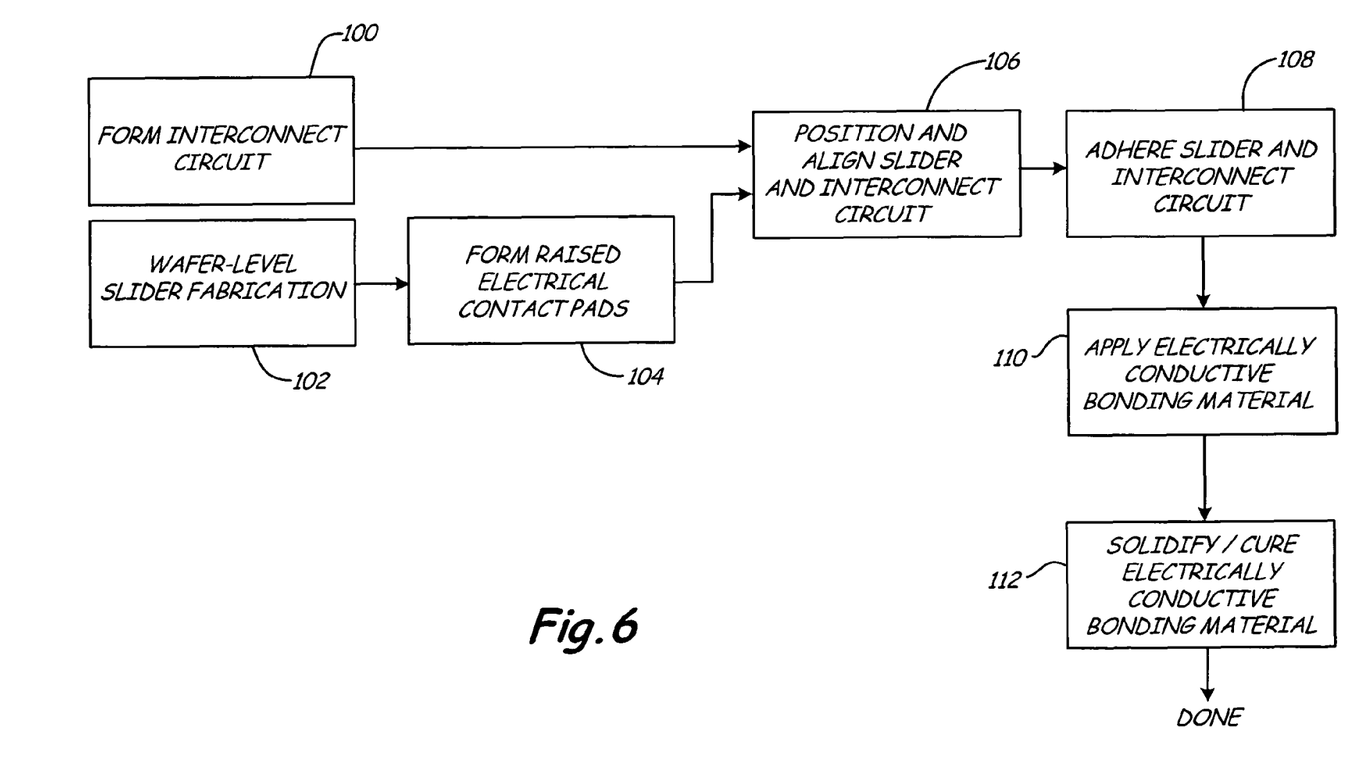
FIG. 6 is a flow chart of a method of fabricating an electrical interconnection assembly according to one embodiment of the present invention.

FIG. 6 is a flow chart of a method of fabricating an electrical interconnection assembly. An interconnect circuit is formed at step 100, which establishes suitable traces, bond pads and electrical contact pads. The interconnect circuit can be formed using known processes (e.g., conventional photolithography techniques). Also, a slider is fabricated beginning with wafer-level processing (step 102). Wafer-level processing (step 102) involves processing a plurality of slider assemblies as a single wafer, and typically includes photolithography processes used to form transducing element structures, overcoat layers, conductive studs, bond pads, and other structures upon a slider body. After wafer-level processing (step 102), individual sliders are separated from the wafer. Raised portions of the electrical contact pads are formed on exposed portions of the conductive studs (step 104), for example, using a plating process. It should be noted that steps 102 and 104 can be preformed before, after or substantially simultaneously with step 100 in alternative embodiments.

Next, the slider and the interconnect circuit are positioned adjacent to each other, such that the bond pads, electrical contact pads and other structures are suitably aligned (step 106). The slider and the interconnect circuit are adhered together using an adhesive (step 108). It should be noted that step 108 involves mechanically (or structurally) adhering slider and the interconnect circuit together along the top (or back side) of the slider in order to maintain alignment, and can be performed using conventional adhesive application and curing techniques.

Next, an electrically conductive bonding material is applied to form at least one electrically isolated electromechanical bond between the slider and the interconnect circuit (step 110). Step 110 can be performed using known solder jetting techniques, known adhesive application techniques, or other processes. The electrically conductive bonding material is then set in order to move or tilt portions of the slider and the interconnect circuit together (step 112). As part of step 112, at least one pair of electrical contact pads contact each other to form an electrically isolated electrical connection that is biased by the set electrically conductive bonding material. Setting the bonding material can involve removing thermal energy, exposing a UV light source, or other processes selected according to the particular electrically conductive bonding material utilized.

It should be recognized that other steps can be performed, though not specifically mentioned above.

It will be recognized that the present invention provides a number of advantages and benefits. For example, high density electrical interconnections can be realized in a relatively simple and cost-effective manner. Manufacturing yield losses can be reduced. An electrical interconnection assembly according to the present invention allows for smaller slider sizes, meaning more sliders can be fabricated on a single wafer, while maintaining a given number of discrete, electrically isolated electrical connection points. Furthermore, or in the alternative, the number of discrete, electrically isolated electrical connection points provided in a small, given area can be increased. Moreover, as mentioned above, pole-tip recession risks can also be reduced. In addition, some design constraints imposed by prior art electrical interconnection configurations and methods can be lessened.

Although the present invention has been described with reference to preferred embodiments, workers skilled in the art will recognize that changes may be made in form and detail without departing from the spirit and scope of the invention. For instance, the present invention can be utilized beyond hard disc drive application, such as for making electrical interconnections for "flip chips".

The invention claimed is:

1. An electrical connection assembly comprising:
    a body;
    an electrically insulative layer supported by the body;
    a first bond pad defined on the electrically insulative layer;
    a first electrical contact pad defined on the electrically insulative layer and electrically isolated from the first bond pad;
    a circuit located adjacent to the electrically insulative layer defining a second bond pad and a second electrical contact pad that are electrically isolated from each other; and
    an electrically conductive bonding material that electrically and mechanically links the first and second bond pads, wherein upon setting the electrically conductive bonding material biases the first and second electrical contact pads against each other in order to create an electrical connection therebetween.

2. The assembly of claim 1, wherein the first bond pad and the first electrical contact pad are arranged at different exterior faces of the electrically insulative layer.

3. The assembly of claim 1, wherein the first bond pad and the first electrical contact pad are arranged at approximately 90° to each other.

4. The assembly of claim 1, wherein at least a portion of the first electrical contact pad stands proud relative to a surface of the electrically insulative layer.

5. The assembly of claim 1, wherein the first electrical contact pad comprises:
    a stud extending into the electrically insulative layer; and
    an extension attached to the stud that protrudes from a surface of the electrically insulative layer.

6. The assembly of claim 1 and further comprising:
    an adhesive for mechanically connecting the body to the circuit.

7. The assembly of claim 1, wherein the electrically conductive bonding material comprises a solder that shrinks upon setting.

8. The assembly of claim 1 and further comprising:
    a transducing element supported by the electrically insulative layer, wherein the transducing element is electrically connected to at least one of the first bond pad and the first electrical contact pad.

9. The assembly of claim 8, wherein the transducing element is laterally spaced from the first bond pad.

10. An electrical connection assembly for a hard disc drive, the assembly comprising:
    a slider subassembly comprising:
        a slider body;
        an electrically insulative layer supported by the slider body;
        a first bond pad defined on the electrically insulative layer;
        a first electrical contact pad defined on the electrically insulative layer and electrically isolated from the first bond pad;
    a flex circuit subassembly located adjacent to the slider subassembly, the flex circuit assembly comprising:
        a substrate;
        a second bond pad defined on the substrate; and
        a second electrical contact pad defined on the substrate and electrically isolated from the second bond pad; and
    an electrically conductive bond formed between the first and second bond pads, wherein after setting the electrically conductive bond contracts and further mechanically biases the first and second electrical contact pads into physical contact with each other in order to create a dry electrical connection therebetween.

11. The assembly of claim 10, wherein the first bond pad and the first electrical contact pad are arranged at different exterior faces of the electrically insulative layer.

12. The assembly of claim 10, wherein at least a portion of the first electrical contact pad stands proud relative to a surface of the electrically insulative layer.

13. The assembly of claim 10, wherein the first electrical contact pad comprises:
    a stud extending into the electrically insulative layer; and
    an extension attached to the stud that protrudes from a surface of the electrically insulative layer.

14. The assembly of claim 10, wherein the electrically conductive bond is formed with a solder that shrinks upon setting.

15. The assembly of claim 10 and further comprising:
    a transducing element supported by the electrically insulative layer, wherein the transducing element is electrically connected to at least one of the first bond pad and the first electrical contact pad.

16. The assembly of claim 15, wherein the transducing element is laterally spaced from the first bond pad.

17. The assembly of claim 10, wherein the slider subassembly includes a plurality of bond pads defined on the electrically insulative layer.

18. A method of connecting two components, the method comprising:
    positioning a first article adjacent to a second article such that first and second dry electrical contact pads of the first and second articles, respectively, remain spaced apart;
    applying an electrically conductive bonding material between first and second bonding pads of the first and second articles, respectively; and
    causing the electrically conductive bonding material to shrink;
    wherein causing the electrically conductive bonding material to shrink causes an electromechanical bond between the first and second bonding pads of the first and second articles to set; and
    wherein causing the electrically conductive bonding material to shrink draws the first and second dry electrical contact pads of the first and second articles into physical contact with each other to form a dry electrical connection therebetween that is separated from the electromechanical bond between the first and second bonding pads.

19. The method of claim 18, wherein the step of causing the electrically conductive bonding material to shrink comprises setting a solder material.

20. The method of claim 18 and further comprising:
prior to applying an electrically conductive bonding material, applying an adhesive to secure the first and second articles together when positioned adjacent to each other, wherein the adhesive is applied at a location spaced from the first and second dry electrical contact pads.

* * * * *